Patented Dec. 31, 1946

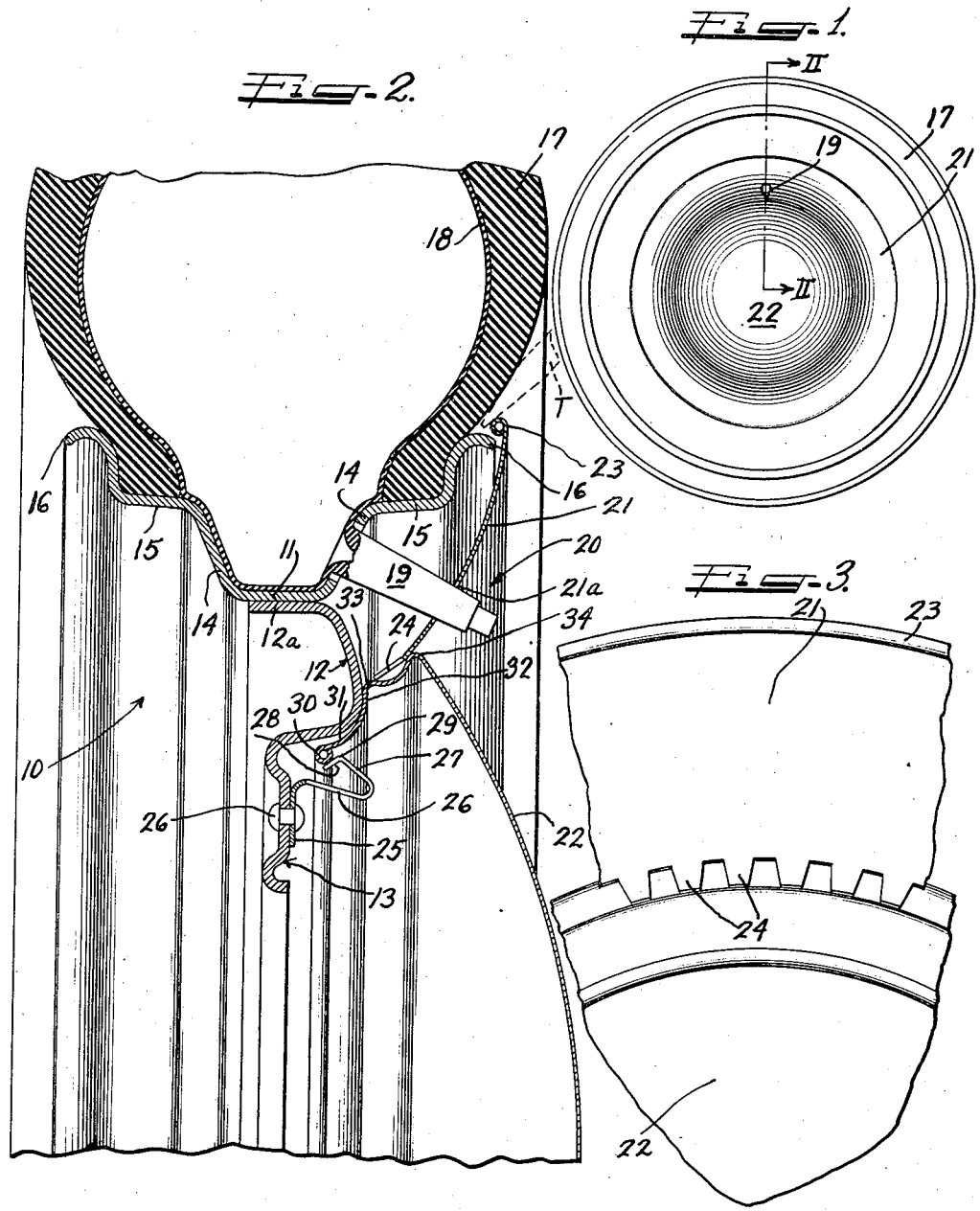

2,413,328

UNITED STATES PATENT OFFICE 2,413,328

WHEEL STRUCTURE

George Albert Lyon, Allenhurst, N. J.

Application August 20, 1943, Serial No. 499,324

8 Claims. (Cl. 301—37)

This invention relates to an improved wheel structure and is directed more particularly to an improved cover assembly therefor.

It is an important object of the invention to provide for a multi-part cover assembly adapted for disposition over the outer side of a wheel structure, improved retaining means for maintaining the cover parts upon the wheel structure.

Still another object of the invention is to provide for a wheel structure an improved multi-part cover assembly for disposition over the outer side thereof, one of said parts being detachably secured to the wheel structure proper and another of said parts being arranged for retaining engagement with the cover part secured to the wheel structure.

It is a further object of the invention to provide for a multi-part cover assembly adapted for disposition over the outer side of a wheel structure, an improved retaining arrangement whereby one of said parts may be detachably secured to the wheel structure proper while the other part may be secured to the first named part to provide an assembled, unitary structure capable of being handled as a unit without the various parts becoming detached from one another unless such detachment is specifically desired.

It is still another object of the invention to provide for a wheel structure a multi-part cover assembly including a radially outer annular portion and a central circular hub cap portion, said cover portions being secured together by virtue of substantially radially outwardly extending spaced ribs on the central hub cap simulating cover member and resilient retaining fingers provided at the radially inner edge of said radially outer annular cover member, one of said ribs being arranged to provide an abutment for the terminal ends of said retaining fingers on the annular cover member and the other of said ribs providing a support for an intermediate portion of the annular cover member when the fingers are disposed in retaining engagement with the circular hub cap simulating cover member.

In accordance with the general features of my invention there is provided herein a wheel structure having a drop center type tire rim and a central load bearing portion secured thereto, there being a cover assembly disposed over the outer side thereof, said cover assembly including a radially outer annular portion preferably provided with a radial expanse sufficient to enable it to extend radially outwardly beyond the edge portion of the tire rim and radially inwardly beyond the junction of the tire rim with the central load bearing portion, said annular cover being provided with radially inwardly, axially inwardly, obliquely disposed retaining fingers and having a cross-sectional configuration of such curvature as to generally simulate the curvature of the adjacent side wall of a tire mounted in the tire rim, there being resilient retaining members on the outer surface of the central load bearing portion of the wheel structure and a central circular hub cap simulating member retainingly, detachably engaged thereon, said hub cap member being provided at an intermediate portion thereof with substantially radially outwardly extending spaced ribs, one of which is arranged to retainingly receive the terminal ends of the resilient fingers on the annular cover member and the other of which is adapted to provide radial support for an intermediate part of the cover member to maintain the fingers in their retained position with respect to the central circular hub cap member.

Other objects and advantages of the invention will become apparent from the following description and accompanying drawing in which:

Figure 1 is a side elevational view of a wheel structure embodying my invention;

Figure 2 is a fragmentary radial cross-sectional view taken on the line II—II of Figure 1; and Figure 3 is a fragmentary rear elevational view of the cover assembly showing the association of the retaining means of one cover portion with the rib formation of the other cover member.

It will be understood that the embodiments shown herein are for illustrative purposes only and may be changed or modified without departing from the spirit and scope of the invention as set forth in the appended claims.

As best shown in Figure 2, the wheel structure with which my invention is associated may take the form of a drop center type tire rim 10 having a base flange 11 to which is secured a central load bearing portion 12 by virtue of an axially inwardly extending flange 12a which may be secured to the base flange 11 by riveting or welding or the like.

The central load bearing portion 12 may be further provided with a bolt-on flange 13 which may be utilized for securing the wheel structure to a vehicle by attachment to a suitable appurtenance thereof such as the brake drum or the like.

The tire rim 10 is further provided with opposite side wall flanges 14, opposite intermediate flanges 15 and opposite edge portions 16 between which may be disposed the radially inner portions of a tire 17 having a tube 18 and a valve stem 19 which extends through a suitable aligned aperture in the adjacent side wall flange 14.

The cover assembly 20 includes an outer annular part 21 and a central hub cap simulating portion 22, these parts being constructed from a suitable sheet material such as thin sheet metal or the like.

The cover member 21 is constructed with a radial cross-sectional expanse of such configuration and magnitude that it substantially simulates the side wall of the tire 17 to appear as a continuation thereof and to appear as the white side wall of a massive tire mounted on a wheel structure of minimum dimensions, when colored white. As will be seen from Figures 1 and 2, the cover member 21 extends radially outwardly sufficiently far to extend beyond the edge portion 16 of the tire rim and thus to substantially conceal the junction between the tire rim and the tire, this radially outer extending margin preferably being provided with a bead 23 which serves to reinforce the outer edge of the cover assembly and to facilitate in the removal of the cover assembly from the wheel structure as will be explained presently.

The radial inward expanse of the annular cover member 21 is such that the radially inner part thereof extends inwardly beyond the junction between the tire rim 10 and the body portion 12. As will best be seen from Figures 2 and 3, the radially inner margin of the cover member 21 is configurated to provide radially inwardly, axially inwardly, obliquely disposed retaining fingers 24 which are arranged to retainingly engage the central hub cap simulating cover part 22 in a manner to be explained presently. In the event that the valve stem 19 is of such a length that it protrudes axially outwardly beyond the cover member 21, the latter is preferably provided with a suitable aperture 21a for receiving the outer end of the valve stem 19.

As will best be seen from Figure 2, there is provided on the outer side of the bolt-on flange, an annulus 25 which is secured to the outer surface thereof by welding or riveting as shown at 26. This annulus is provided with circumferentially spaced generally axially outwardly extending resilient arms 26 terminating in bent back portions 27 which extend radially outwardly, axially inwardly and are thus obliquely disposed, each of the members 27 terminating in axially inwardly, radially inwardly, obliquely disposed terminal portions 28 whereby a plurality of circumferentially spaced radially outwardly extending peaks 29 are formed.

The central hub cap simulating member 22 is provided at the peripheral edge thereof with a retaining bead 30 which serves as the terminal edge of a generally axially, inwardly extending flange 31, the flange 31 merging into a generally radially extending flange 32 which is arranged preferably to overlie the adjacent portion of the outer surface of the wheel structure to be supported thereby when the hub cap member 22 is secured on the wheel.

Disposed adjacent the circular portion 32 of the hub cap member is a generally radially outwardly extending rib 33 which, with a companion, spaced, radially outwardly extending rib 34, serves to cooperate retainingly with the inner marginal portion of the cover member 21 in a manner to be described presently.

In applying the central cover member 22 to the wheel structure, it will be seen that axial inward movement thereof and particularly the bead 30 thereof toward the wheel structure will cause the bead to engage the resilient clip portions particularly at the members 27 thereof, whereupon the clip members will be sprung radially inwardly since the circle prescribed by the peaks 29 is normally greater than that prescribed by the radially inner extremity of the bead 30. After the bead 30 has passed the peaks 29, the respective clip members will then spring radially outwardly into a position shown in Figure 2, whereby the terminal portions 28 thereof bear against the bead 30 to retain the same with the cover 22 upon the wheel structure and draw the cover radially inwardly so that the circular portion 32 is drawn into surface abutment with the adjacent portion of the surface of the wheel structure.

Preferably the cover member 21 is applied to the central hub cap member 22 before the assembly is attached to the wheel structure. From Figure 2 it will be seen that if the cover member 21 is aligned concentrically with the central hub cap member 22 and then is urged axially relative thereto from the rear side thereof, the fingers 24 will be sprung radially outwardly to override the bead 33 and this axial movement of the cover member 21 may be continued until an intermediate part thereof abuts the radially outwardly extending bead 34 against which this portion of the cover 21 rests for supporting engagement during attachment of the cover parts. Upon completion of this axial movement of the cover member 21 it will be seen that the terminal ends of the teeth 24 have been drawn beyond the bead 33 whereby the ends of the teeth bite into the material of the hub cap member 22 to provide a secure retained engagement between the parts with an intermediate portion of the cover member 21 being supported by the bead 34 as previously described.

The cover members 21 and 22 having been secured together in the foregoing manner, the entire cover assembly may then be applied to the wheel structure by engagement of the clips 26 with the cover member 22 as described above, the spacing between the radially outer parts of the cover assembly and the adjacent portion of the wheel structure being predetermined by the abutment of the circular portion 32 of the cover member 22 with the adjacent portion at the outer surface of the body part 12 of the wheel.

The parts having been assembled in the foregoing manner, it will be seen that a pry-off tool T such as the point of a screw driver or the like may be inserted behind the bead 23 and against the adjacent portion of the outer surface of the side wall of the tire 17. The operator then raises the outer portion or handle of the tool T, thereby causing the point thereof to move axially outwardly against the bead 23 to draw the same axially outwardly of the wheel structure. This axial outward movement is transmitted through the body of the cover member 21 to the outer peripheral portion of the central hub cap member 22 which is then drawn axially outwardly over the resilient clip members 26, the latter being sprung radially inwardly to quickly and easily afford removal of the cover assembly. Thus it will be seen that there is provided herein a multipart cover assembly in which the parts may be efficiently secured together to provide a single unitary structure and which at the same time may be conveniently and easily removed from the wheel structure, although when applied thereto it is held securely against accidental removal. With such a construction it will be seen that the retention upon the wheel structure is accomplished by virtue of the engagement of one of the cover parts thereto, the other cover part being retained as a portion of the cover assembly merely by engagement with the first named cover part. Furthermore it will be seen that the cover parts of my multi-part cover assembly may be secured together efficiently to provide a single unitary structure and at the same time the parts may be removed from one another by disengaging the fingers 24 progressively from the radially extending bead 33 of the cover member 22 whereby either of the cover parts may be replaced with a new part should it become damaged beyond further use.

Another attribute of the invention disclosed herein is that since the cover member 21 is retainingly engaged upon the cover member 22 by movement axially from the rear side thereof, it will be seen that once the assembly is disposed over the wheel structure the complete cover assembly will be retained thereon so long as the central cover member 22 is engaged on the wheel. This relationship of the parts will be understood when it is noted that the radial outward expanse of the rib 34 on the cover member 22 is considerably greater than the radial expanse of the central aperture of the cover member 21.

What I claim is:

1. In a cover structure for a wheel, having a tire rim and a central body part, there being retaining means on the outer side of the wheel structure, a radially outer annular cover part for the tire rim and a central, separate circular hub cap simulating part for the body part, said hub cap having a retaining portion for detachably engaging said retaining means on the outer side of the wheel structure and an intermediate portion extending radially outwardly from said retaining portion, said annular part having a radially inner biting margin formed to retainingly engage the radially outwardly extending portion of the hub cap and being resiliently and wedgingly engageable therewith by axial movement thereagainst from the rear side to afford a unitary, multi-part cover assembly.

2. In a wheel structure including a tire rim and a central load bearing portion, a multi-part cover assembly including a radially outer annular portion and a central circular hub cap simulating portion, said annular portion being arranged for disposition over the outer side of the radially outer part of the wheel structure and having a cross-sectional configuration enabling it to generally simulate the curvature of a side wall of a tire in the tire rim to give the appearance of being a continuing part thereof and having at the radially inner margin thereof generally radially inwardly extending resilient fingers, said central hub cap simulating portion being provided at the peripheral margin thereof with generally radially inwardly, axially inwardly extending retaining means and having at an intermediate part thereof radially outwardly extending means for receiving the terminal edges of said fingers on the annular cover portion to afford retaining engagement between the cover portions, said hub cap simulating portion also having a radially outwardly extending intermediate part for supportingly engaging an intermediate part of the annular cover portion when said last named cover portion is urged axially over the axial inner portion of the hub cap simulating cover from the rear side thereof to bring the terminal edges of said fingers of the annular cover portion into retaining engagement with the hub cap simulating cover portion.

3. In a wheel structure having a tire rim and a central load bearing portion, a multi-part cover assembly including an outer annular cover portion and a central circular hub cap cover portion, means on the wheel structure for retainingly engaging the central hub cap cover portion, said annular cover portion having at the radially inner margin thereof, fingers arranged to resiliently, retainingly engage the central hub cap portion to form a unitary, multi-part cover assembly, said hub cap simulating portion being provided at an intermediate part thereof with means for retainingly engaging the terminal ends of said fingers on the annular cover portion and also with radially outwardly extending means for supportingly engaging a part of the annular cover portion disposed radially outwardly from the terminal ends of said fingers.

4. In a wheel structure having a tire rim and a central load bearing portion, a multi-part cover assembly for disposition over the outer side of the wheel structure, including a radially outer annular cover part and a central circular cover part, cover retaining means on said wheel structure, said circular cover part being provided at the peripheral margin thereof with a retaining portion for retainingly engaging said retaining means on the wheel structure and being provided at an intermediate part thereof with axially spaced, radially outwardly extending protuberances, said annular cover part being provided at the radially inner margin thereof with resilient fingers arranged to be flexed over the axially inner protuberance of said circular cover part by movement of the annular cover part axially outwardly over the rear side thereof, and said spaced protuberance being arranged to supportingly engage the radially outer cover part at an intermediate point thereof when said beads engage the first named protuberance of said hub cap member.

5. In a wheel structure having a radially outer tire rim and a radially inwardly extending central load bearing portion, a cover assembly for disposition thereover including a radially outer annular part arranged for disposition over the outer side of the tire rim and a central circular hub cap simulating cover part arranged for disposition over the load bearing portion of the wheel structure, retaining means on said wheel structure at a radially inner part of said central load bearing portion, said hub cap cover part having the peripheral margin thereof formed to provide a substantially axially inwardly extending snap-on flange for retaining engagement with said retaining means on the wheel structure and having an intermediate portion arranged for surface engagement with the adjacent portion of the outer surface of the wheel structure to be supported thereby and also having a radially outwardly extending annular portion for retainingly receiving said annular cover part, said annular cover part being provided at the radially inner margin thereof with resilient fingers arranged for engagement with said last named annular portion of the hub cap cover part to provide a unitary, multi-part cover assembly attachable to the wheel structure by virtue of the engagement of the hub cap part thereto.

6. As an article of manufacture, a multi-part cover assembly for disposition over the outer side of a wheel structure including a tire rim and a central load bearing portion, said cover assembly including a radially outer annular cover part and a central circular hub cap simulating cover part, said hub cap simulating part having a generally axially inwardly extending flange for retaining engagement with a wheel structure, said flange merging into an annular portion arranged for surface engagement with the adjacent portion of the surface of a wheel structure to be supported thereby, and having a radially outwardly extending intermediate part including axially spaced, radially outwardly extending protuberances one of which is arranged to retainingly receive the radially inner extremity of the annular cover member and the other which is arranged to abut and support an intermediate part of the annular cover member when said cover parts are secured together.

7. In a cover assembly for disposition over the outer side of a vehicle wheel, a radially outer, annular, resilient cover part and a central circular cover part, said central cover part having axially inwardly disposed wheel engaging means and having an intermediate portion provided with axially spaced protuberances, said annular cover part having a radially inner resilient margin formed so that the inner extremity thereof may be resiliently deflected against the axially innermost protuberance on the circular cover part and so that an intermediate portion thereof may supportingly abut the axially outermost protuberance on the circular cover part.

8. In a cover structure for a wheel including a tire rim and a body part having hub cap retaining means, an annular cover for the tire rim and a central hub cap detachably held on the body part and having spaced ribs on its outer peripheral portion, said annular cover having an inner resilient margin resiliently deflected between said ribs on the hub cap to join the cover to the hub cap in a unitary assembly.

GEORGE ALBERT LYON.